United States Patent
Llop Ramon

(10) Patent No.: US 11,274,191 B2
(45) Date of Patent: Mar. 15, 2022

(54) METHOD FOR OBTAINING A PHOTOCATALYTIC POLYMER

(71) Applicant: SYSTEM-POOL, S.A., Villarreal (ES)

(72) Inventor: Ramiro Llop Ramon, Villarreal (ES)

(73) Assignee: SYSTEM-POOL, S.A., Villarreal (ES)

( * ) Notice: Subject to any disclaimer, the term of this patent is extended or adjusted under 35 U.S.C. 154(b) by 478 days.

(21) Appl. No.: 16/479,394

(22) PCT Filed: Feb. 13, 2017

(86) PCT No.: PCT/ES2017/070082
§ 371 (c)(1),
(2) Date: Jul. 19, 2019

(87) PCT Pub. No.: WO2018/134450
PCT Pub. Date: Jul. 26, 2018

(65) Prior Publication Data
US 2019/0359813 A1    Nov. 28, 2019

(30) Foreign Application Priority Data

Jan. 19, 2017   (ES) ................................ ES201730056

(51) Int. Cl.
| | | |
|---|---|---|
| *C08K 9/06* | (2006.01) | |
| *B01J 31/06* | (2006.01) | |
| *B01J 35/00* | (2006.01) | |
| *B01J 37/04* | (2006.01) | |
| *B01J 37/34* | (2006.01) | |
| *C08K 3/22* | (2006.01) | |
| *C08K 5/5415* | (2006.01) | |
| *C08L 33/12* | (2006.01) | |
| *C08L 67/00* | (2006.01) | |

(52) U.S. Cl.
CPC ................ *C08K 9/06* (2013.01); *B01J 31/06* (2013.01); *B01J 35/004* (2013.01); *B01J 37/04* (2013.01); *B01J 37/345* (2013.01); *C08K 3/22* (2013.01); *C08K 5/5415* (2013.01); *C08L 33/12* (2013.01); *C08L 67/00* (2013.01); *C08K 2003/2227* (2013.01); *C08K 2003/2241* (2013.01)

(58) Field of Classification Search
CPC .......... C08K 3/22; C08K 5/5415; C08K 9/06; C08K 2003/2227; C08K 2003/2241; C08L 33/12; C08L 67/00
See application file for complete search history.

(56) References Cited

U.S. PATENT DOCUMENTS

| | | |
|---|---|---|
| 5,227,435 A | 7/1993 | Kang et al. |
| 6,017,993 A | 1/2000 | Maeda et al. |
| 6,210,779 B1 | 4/2001 | Watanabe et al. |
| 7,862,910 B2 | 1/2011 | Krisko et al. |
| 2013/0172468 A1 | 7/2013 | Kim et al. |
| 2014/0296386 A1 | 10/2014 | Maeda et al. |

FOREIGN PATENT DOCUMENTS

| | | |
|---|---|---|
| EP | 2443076 B1 | 4/2014 |
| WO | 2016101082 A1 | 6/2016 |

OTHER PUBLICATIONS

International Search Report for Corresponding International Application No. PCT/ES2017/070082 (3 Pages) (dated Aug. 4, 2018).

*Primary Examiner* — Edward J Cain
(74) *Attorney, Agent, or Firm* — Lucas & Mercanti, LLP

(57) ABSTRACT

A method for obtaining a photocatalytic polymer is provided. The method is carried out by mixing aluminium trihydroxide (ATH) and a photocatalytic particle in a polar solvent at a pH between 5 and 7 under stirring, adding silane or siloxane, stirring for a period of time of 100 min at a temperature between 30 and 50° C., extracting the solid phase being formed and drying for obtaining a photocatalytic additive, adding the photocatalytic additive to an acrylic or polyester resin and polymerizing. The method may be applied onto any type of polymer base, such as vinyl, fluoropolymers, polyamide, polycarbonates, polyethylene or epoxides. Another aspect of the invention is the photocatalytic additive being obtained. The resulting polymer shows catalytic homogeneity, operating the photocatalytic particles in all the surfaces of the material with the same activity.

17 Claims, 4 Drawing Sheets

METHOD FOR OBTAINING A PHOTOCATALYTIC POLYMER

CROSS-REFERENCE TO RELATED APPLICATIONS

This application is a 371 of PCT/ES2017/070082, filed Feb. 13, 2017, which claims the benefit of Spanish Patent Application No. P 201730056, filed Jan. 19, 2017.

TECHNICAL FIELD

The present invention refers to a method for obtaining a plastic or polymer material containing an active photocatalytic additive, for use thereof in building or in interior design, decoration sector and for use in outer areas such as facades.

BACKGROUND OF THE INVENTION

Except for photocatalytic cement, building and decoration materials do not incorporate bulk photocatalytic particles efficiently. The way in which these achieve photocatalytic properties is thanks to additive or paint coatings being applied thereon.

The most common method in the art is to apply layers with a binder or adhesive and by means of a sol-gel process. In both cases a solvent is used which contains and disperses the photocatalytic agent, and an application system onto the surface of the material.

The application of a photocatalytic additive in overlaying layers involves many problems. These are applied with aerosols and solvents as volatile organic compounds, which are environmental pollutants and which also cause harmful effects on health by inhalation thereof. The photocatalytic material layers being added may modify the material surface properties, aspect and colour. Furthermore, by overlaying a new layer to a product this can lose original surface texture or shapes, as well as the finishing or polish for control of light diffraction or final colour shades. The product being added must be compatible with the base material; however, in certain cases priming may show lack of compatibility in its components, in the surface being exposed to wear or having pores.

The application of the photocatalytic layer is also associated to the visible face of the piece, and in no case to the side faces or to the opposite one. Building materials usually have seals or material changing areas where the added material does not reach.

With time, the added layers tend to lose effectivity due to adhesion, wear, abrasion or thickness variation problems, being necessary to renovate it. This can imply a distribution and homogeneity problem, since aerosol application is not usually continuous, making these processes generally little flexible and reproducible, The quantity of material being applied or thickness of the outer layers is often difficult to reproduce and its variability is too high from one application to the other.

The application process of the additional layer requires an extra heating step at high temperatures so as to attain adhesion to the material surface. At those high temperatures, the photocatalytic material may deactivate; for example, titanium dioxide ($TiO_2$) undergoes transformation of its anatase structure, which is the most active, into rutile being less active.

All the above results in that the materials to which a photocatalytic additional layer is applied are poor regarding photocatalysis, and the reproducibility thereof at industrial production level is often difficult.

Also, applying a layer involves a modification of the final product which implies an added cost, generally high.

U.S. Pat. No. 6,210,779 B1 describes the method for incorporating photocatalytic material to a finished product applying surface energy. The method describes how to add the additional layer playing that function, as well as a binder for adhesion of the photocatalytic material to the piece. In the present invention, however, the photocatalytic material is included in the whole mass and does not need an additional binder. In the method of the invention, the material does neither undergo any heating which can degrade the photocatalytic material, nor uses additional solvents.

EP 2443076 B1 describes the method for incorporating photocatalytic material superficially to a finish product by an additional binding step using an adhesive. The process needs an extra addition and heating step at high temperatures. Again, it differs from the method of the present invention in that the photocatalytic material is included in the whole mass and it does not require an additional binder, since interaction with the rest of components is improved. In the process disclosed, the material does neither undergo any heating that can degrade the photocatalytic material nor use additional solvents.

U.S. Pat. No. 7,862,910 B2 describes the multi-layer method for introducing photocatalytic material into a finished product consisting of materials of different nature. It differs from the method of the present invention in that in the latter the photocatalytic material is incorporated in the whole mass.

In the methods of the art, photocatalytic particles cannot be added directly to the base material since they flocculate, agglomerate in dissolution and the dispersion thereof is considerably lost, with its intended photocatalytic effect becoming eliminated or reduced. (Zhou D et al. "Influence of Material Properties on $TiO_2$ Nanoparticle Agglomeration", PLoS One. 2013, 8(11): e81239).

There have been attempts in the art for dispersion and improvement of the photocatalytic particles interaction with the other materials and components with anti-agglomerating processes. In this sense, silane or siloxane and aluminium trihydroxide (ATH) are not proper anti-agglomerating products. ATH is the main mineral component in most coating formulations ("solid surface"). One of the properties of this compound is the presence of hydroxyl groups being likely to react by de-hydration with other components.

The problem of the art is to find a method for a photocatalytic additive to be added in bulk into a polymer material, keeping high dispersion and activity. The solution proposed in the present invention is a method for obtaining said additive in which the photocatalytic particle is reacted with ATH and silane or siloxane.

DESCRIPTION OF THE INVENTION

The present invention is a method for obtaining a photocatalytic polymer, comprising mixing aluminium trihydroxide (ATH) and at least a photocatalytic particle into a polar solvent at a pH between 5 and 7 under stirring, stirring for a minimum period of time of 80 min, preferably a maximum time of 100 min and more preferably between 100 and 200 min, at a temperature between 30 and 50° C., extracting the solid phase being formed and drying so as to obtain a photocatalytic additive, and adding said photocatalytic additive to an acrylic resin or polyester, and then polymerizing so as to obtain the photocatalytic polymer. In a more restrictive aspect, the method of the invention consists of these steps.

In a preferable aspect of the invention, the method can be applied onto any other type of polymer base, such as a vinyl base, fluoropolymers, polyamides, polycarbonates, polyethylenes or epoxides.

In a preferably aspect, said polar solvent is water or a mixture of water/ethanol, much preferably water.

In another preferable aspect, two photocatalysts are mixed based on the final use of the material or the intended values of the photocatalytic activity. Photocatalysis may also be attained by photocatalysts pairs such as, preferably, $TiO_2$ rutile with ZnS and $TiO_2$ rutile with ZnO. Generally, a white-coloured photocatalyst with more decorative purposes, such as $TiO_2$ rutile, ZnS, $SnO_2$ or ZnO is mixed with a more active photocatalyst such as $TiO_2$ anatase. $TiO_2$ rutile and $TiO_2$ anatase are two photocatalysts having different activation energies. So, another preferable aspect is that said photocatalyst particles are selected from $TiO_2$ rutile, ZnS, $SnO_2$, ZnO CdS, $Fe_2O_3$, $Cu_2O$, $WO_3$, $SnO_2$ or $TiO_2$ anatase, or mixtures thereof. In another more preferable aspect a combination is used including $TiO_2$ anatase with the following properties:
  Density (ISO 787, Part 10) 3.9 $g/cm^3$
  Specific surface area (BET)>225 $m^2/g$
    Water demand, 210 g/100 g
  Maximum processing temperature 200° C.
    pH range of application 4-9
In another more preferable aspect, the pH of the dissolution is kept between 5.5 and 6.

On the photocatalyst dissolution, the desired ATH amount is added as mineral filler of the final product. The choice of the type of ATH is subjected to the final application of the product. In another additional preferable aspect of the method of the invention, said ATH is added at a concentration between 10 to 65% by weight with respect to the total weight of the photocatalytic additive.

Another mineral filler of free choice may be added, according the final use of the material, this being either silica, kaolin, aluminium trihydroxide, magnesium hydroxide, calcium carbonate or barium sulphate.

A preferable aspect of the invention includes removal of particles lower than 0.5 µm before adding silane or siloxane, even more preferably by sieving. The mixture is sieved for removing said particle size and avoid that these become harmful by inhalation thereof.

The resulting mixture is then added silane or siloxane so as to achieve strong interaction between the ATH hydroxyl groups with the transition metals acting as photocatalysts and thus increase photocatalytic efficiency.

In a preferable aspect, said siloxane is bis[3-(trietkoxysylyl)propyl] tetrasulphide. In another preferable aspect, said silane is of alkyl nature, for example methyltrimethoxysilane; unsaturated, as for example gamma-Methacryloxypropyl-trimethoxysilane; aromatic, as for example vinyl-tris-(ethoxy)silane; or an aminosilane, as for example gamma-aminopropyltriethoxysilane or N-beta-(aminoethyl)-gamma-aminopropyltrimethoxysilane.

In order to improve the interaction degree between the components, a dispersant can be used so as to break agglomerates and big-sized particles. Upon incorporating these components into the formulation, it becomes possible to control and know the exact amounts intended to be included in the final product, and the effect thereof. A wetting agent can also be added, preferably between 0 and 1.5% of distilled water.

This mixture must be stirred preferably for a period longer than 2 hours, preferably between 2 and 5 hours. Stirring temperature will preferably be between 40 and 50° C.

After this period, the ATH being modified with the photocatalyst is separated from the aqueous phase, preferably by decanting.

The obtained product constitutes the photocatalytic additive as such, which can be then dried in furnaces at a temperature of about 80° C. for at least 24 hrs. Another preferable aspect of the method of the invention is that it now includes milling so as to reduce the particle size. This photocatalytic additive can be mechanically dry-stirred for subsequent sieving thereof and for obtaining the desired particle size range.

The method for obtaining the final photocatalytic material is performed at room temperature, with the temperature only increasing due to the exothermal reaction itself during the polymerization step.

The method of the invention makes the photocatalytic particles not to agglomerate in the polymer base into which the additive is added, thus controlling the dispersion degree, size and photocatalytic effect, as well as preventing time or erosion wear. It is not necessary to apply any additional paint or additive surface layer to the material of the invention for it to be photo-catalytically active, such that the surface finish of the material is not affected.

The method is reproducible, and keeps the properties of the obtained material constant in time. The best way to prove that the anti-agglomerating method of the present invention is effective is to check that the photocatalytic particles are active in a final polymer piece. The photocatalysis activity in a given material is determined in the art by means of a set of assays following the ISO standard. The main assays being assessed are ISO 10678: 2010, ISO 22197, ISO 22197-1: 2007, ISO 222197-2: 2011, ISO 27448: 2009 and ISO 27447: 2009.

The photocatalytic additive being obtained from the method is a product of the invention. So, another very preferable aspect is a photocatalytic additive comprising at least a photocatalytic particle, aluminium trihydroxide and a silane or a siloxane, most preferably interacting with each other.

The resulting polymer is the most preferable aspect of the present invention. It shows catalytic homogeneity, with all the photocatalytic particles operating with the same activity in all the surfaces of the material. The result is that reactions can occur at the base polymer surface providing the material with properties of volatile organic compounds (VOCs) degradation, toxic gas compounds ($NO_x$, $SO_x$ . . . ) degradation, organic solvents (benzene, toluene . . . ), polluting compounds (formaldehyde, acetaldehyde . . . ) and with antibacterial properties against surface bacteria. Furthermore, it is a self-cleaning surface creating super-hydrophilic liquids, since by being in contact with a liquid such as water or oil, the photocatalytic method modifies the drop angle causing this not to adhere to the surface so easily. All this involves a definite advantage with respect to the state of the art.

The polymer material of the invention may be used in inner and outer areas, it is easily cleaned, renovated, it shows colour stability in time, it keeps the base material hardness, it is hygienic, impact, heat, staining and thermal-shock resistant, and it does not reduce its photocatalytic with time or because of wear.

This material can be introduced in the market in the form of plates or boards which can be transformed subsequently. In a preferable aspect, said plates have a thickness between 3 and 19 mm, with the most usual thickness being 3, 6, 9, 12 and 19 mm. The plate length also varies from 2500 mm to 4000 mm, with the most preferable being 2500 and 3680 mm. The most preferable width ranges between 760 and 1500 mm, the most preferable width being 760, 930 and 1350 mm.

EXAMPLES

Figure 1:
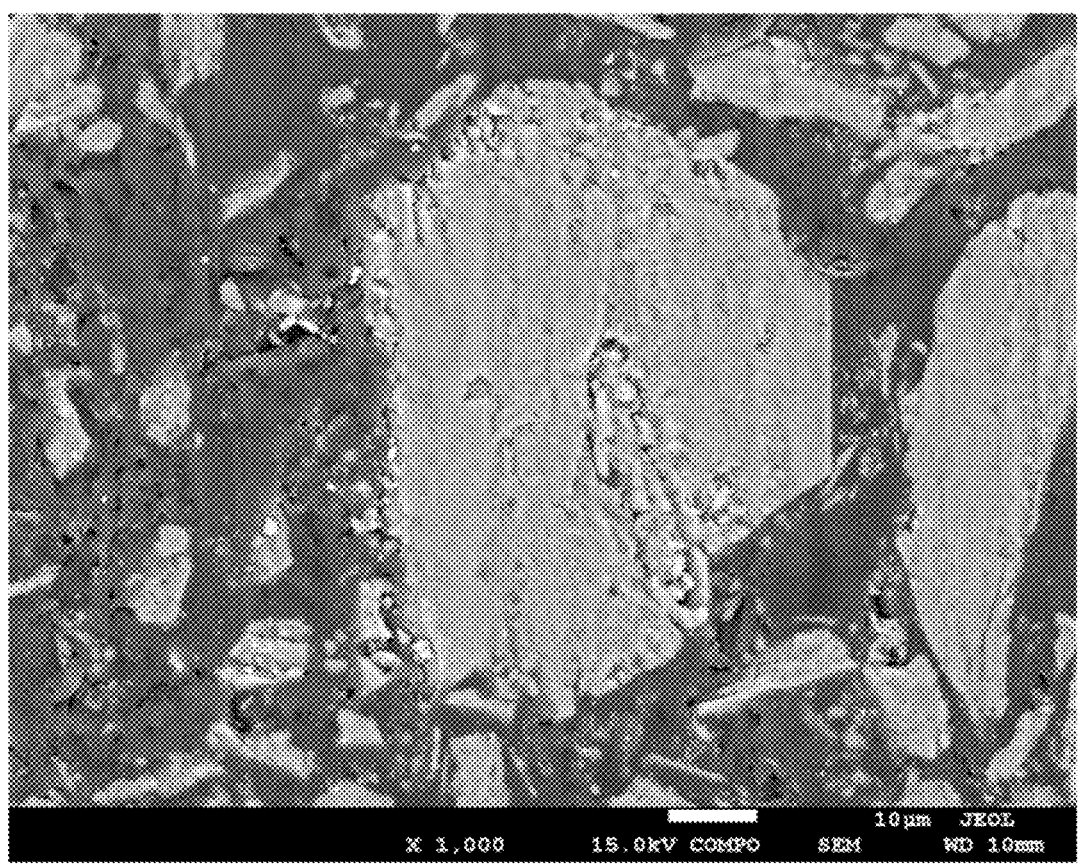
FIG. 1 shows a SEM image of the acrylic material surface with photocatalytic properties.

With the purpose of showing the present invention in an illustrative manner, although being non-limiting anyhow, the following examples are provided. The material for assessment as a material susceptible of being photocatalytic, was quantified following the corresponding ISO standard for each assay. Should not exist a specific standard for the assay, an adaptation has been done of another ISO of similar characteristics according to the assay to be performed.

Example 1: Preparation of the Photocatalytic Mixture 1: ATH—Photocatalysts $TiO_2$ Rutile/$TiO_2$ Anatase with Gamma-Methacryloxypropyl-Trimethoxysilane 55 litres of buffered water at a pH 6.5 were added 30% by weight of $TiO_2$ rutile and 5% $TiO_2$ anatase. This mixture was stirred until completing homogenization. Then aluminium trihydroxide (ATH) was added at a 19.4% percentage under stirring until completing homogenization. Then 10% of gamma-methacryloxypropyl-trimethoxysilane was added and it was stirred for 100 minutes at a temperature of 40° C. All percentages are by weight over the final dissolution weight. The resulting mixture was sieved in the range from 0.5 µm to 1.5 µm and it was left to stand until completing the material deposition. The solid part was separated by decantation and was left to dry until completing total evaporation of the remains of the aqueous phase, and then a milling step took place where the material aggregates were homogenized and broken. The resulting solid was subjected to mechanical stirring for breaking the main agglomerates for obtaining dispersed particles. Then, a second sieving of the material was performed for discarding particles lower than 1.0 µm to 1.5 µm, which may affect health by inhalation thereof, and those bigger than 100 µm for optimizing the final product features.

Example 2: Preparation of the Photocatalytic Mixture 2: ATH—Photocatalysts $TiO_2$ Rutile/ZnO with Gamma-Methacryloxypropyl-Trimethoxysilane 55 litres of buffered water at a pH 6.5 were added 20% by weight of $TiO_2$ rutile and 15% ZnO. This mixture was stirred until completing homogenization. Then ATH was added at a 19.4% percentage under stirring until completing homogenization. Then 10% of gamma-methacryloxypropyl-trimethoxysilane was added and it was stirred for 100 minutes at a temperature of 40° C. All percentages are by weight over the final dissolution weight. The sieving, decanting and stirring methods until obtaining the final product were the same as in Example 1.0

Example 3: Preparation of the Photocatalytic Mixture 3: ATH—Photocatalysts $TiO_2$ Rutile/ZnS with Gamma-Methacryloxypropyl-Trimethoxysilane 55 litres of buffered water at a pH 6.5 were added 20% by weight of $TiO_2$ rutile and 15% ZnS. This mixture was stirred until completing homogenization. Then ATH was added at a 19.4% percentage under stirring until completing homogenization. Then 10% of gamma-methacryloxypropyl-trimethoxysilane was added and it was stirred for 100 minutes at a temperature of 40° C. All percentages are by weight over the final dissolution weight. The sieving, decanting and stirring methods until obtaining the final product were the same as in Example 1.

Example 4: Preparation of the Photocatalytic Mixture 4: ATH—Photocatalyst $TiO_2$ Rutile/$TiO_2$ Anatase with bis[3-(trietkoxysylyl)propyl] tetrasulphide 55 litres of buffered water at a pH 6.5 were added 30% by weight of $TiO_2$ rutile and 5% anatase. This mixture was stirred until completing homogenization. Then ATH was added at a 19.4% percentage under stirring. Then 10% of bis[3-(trietkoxysylyl)propyl] tetrasulphide was added and it was stirred for 100 minutes at a temperature of 40° C. All percentages are by weight over the final dissolution weight. The sieving, decanting and stirring methods until obtaining the final product were the same as in Example 1.

Example 5: Preparation of the Photocatalytic Mixture 5: ATH—Photocatalyst $TiO_2$ Rutile/$TiO_2$ Anatase with Gamma-Aminopropyltriethoxysilane 55 litres of buffered water at a pH 6.5 were added 30% by weight of $TiO_2$ rutile and 5% $TiO_2$ anatase. This mixture was stirred until completing homogenization. Then ATH was added at a 19.4% percentage. Then 10% of gamma-aminopropyltriethoxysilane was added and it was stirred for 100 minutes at a temperature of 40° C. All percentages are by weight over the final dissolution weight. The sieving, decanting and stirring methods until obtaining the final product were the same as in Example 1.

Example 6: Preparation of the Photocatalytic Mixture 6: ATH—Photocatalyst $TiO_2$ Rutile/$TiO_2$ Anatase with vinyl-tris-(ethoxy)silane 55 litres of buffered water at a pH 6.5 were added 30% by weight of $TiO_2$ rutile and 5% $TiO_2$ anatase. This mixture was stirred until completing homogenization. Then ATH was added at a 19.4% percentage. Then 10% vinyl-tris-(ethoxy)silane was added and it was stirred for 100 minutes at a temperature of 40° C. All percentages are by weight over the final dissolution weight. The sieving, decanting and stirring methods until obtaining the final product were the same as in Example 1.

Example 7: Preparation of Acrylic Piece with TiO$_2$ Rutile/TiO$_2$ Anatase as Photocatalysts, without Interaction Process 10 kg of methyl methacrylate resin (MMA), at a 35% percentage, were added 0.09% of distilled water, 30% TiO$_2$ rutile and 5% TiO$_2$ anatase. All percentages are by weight with respect to the total weight. The mixture obtained was stirred for 30 minutes and ATH was added at a 29.7% percentage. After stirring for 60 minutes, benzoyl peroxide was added as initiator at a 0.2% percentage with respect to the total, and it was stirred for 2 minutes. After this time, it was vacuumed for eliminated the air retained therein and after that the mixture was introduced in a mould for obtaining the final piece.

Example 8: Preparation of Acrylic Piece with Photocatalytic Mixture 1

10 kg of methyl methacrylate resin (MMA), at 35% weight percentage, were added 0.09% of distilled water and 0.3% of dimethylaniline. All percentages are by weight with respect to the total weight. Then, the photocatalytic mixture 1 from Example 1 was added at a 64.4% percentage and it was stirred for obtaining a complete dispersion and homogenization. It was subjected to a first vacuum for eliminating the air generated during stirring and matter introduction. Benzoyl peroxide was added on the homogenised mixture as polymerization initiator at a 0.2% percentage. It was vacuum stirred and degasified, and it was introduced into a mould for obtaining the final piece.

Example 9: Preparation of Polyester Piece with Photocatalytic Mixture 1

10 kg of polyester and styrene resin, at 33.3% percentage, were added 0.03% of cobalt octoate as accelerator. Then, the photocatalytic mixture 1 from Example 1 was added at a 64.4% percentage and it was stirred together with the polyester resin for a complete dispersion and homogenization. A first vacuum was performed for eliminating the air generated during stirring and matter introduction. Methyl ethyl ketone was added on the homogenised mixture as polymerization initiator at a 2.2% percentage. The resulting mixture was introduced into a mould or into a metallic aluminium band for obtaining the final piece.

Example 10: Preparation of Acrylic Piece with Photocatalytic Mixture 2

10 kg of a MMA resin base, at 35% percentage, were added 0.09% of distilled water and 0.3% of dimethylaniline. Then, the photocatalytic mixture 2 from Example 2 was added at a 64.4% percentage and it was stirred together with the MMA resin for a complete dispersion and homogenization. A first vacuum was then performed for eliminating the air generated during stirring and matter introduction. Benzoyl peroxide was added on the homogenised mixture as polymerization initiator at a 0.2% percentage. The resulting mixture was vacuum degasified and subsequently was introduced into a mould or metallic aluminium band for obtaining the desired final shape of the acrylic material.

Example 11: Preparation of Acrylic Piece with Photocatalytic Mixture 3

The example 10 is repeated under the same conditions with the photocatalytic mixture 3 prepared in Example 3 with the same percentages, for obtaining a final piece from the acrylic material.

Example 12: Preparation of Acrylic Piece with Photocatalytic Mixture 4

The example 10 is repeated under the same conditions with the photocatalytic mixture 4 prepared in Example 4 with the same percentages, for obtaining a final piece from the acrylic material.

Example 13: Preparation of Acrylic Piece with Photocatalytic Mixture 5

The example 10 is repeated under the same conditions with the photocatalytic mixture 5 prepared in Example 5 with the same percentages, for obtaining a final piece from the acrylic material.

Example 14: Preparation of Acrylic Piece with Photocatalytic Mixture 6

The example 10 is repeated under the same conditions with the photocatalytic mixture 6 prepared in Example 6 with the same percentages, for obtaining a final piece from the acrylic material.

Example 15: Characterization of the Piece Obtained in Example 8

The surface distribution was characterized by scanning electron microscope (SEM; Leica-Zeiss LEO 440, with 1-30 kV electron beam gun), differentiating between dark-coloured organic matter and clear-coloured inorganic matter. The images taken from the material obtained in Example 8 show the perfect distribution of the inorganic particles with mineral fillers and the photocatalyst inside the polymer organic matrix of polymethylmethacrylate (PMMA) (FIG. 1).

Microanalysis of the Material on Image 57.2% CO$_2$ (organic matter)

42.8% Al$_2$O$_3$ (inorganic matter)

Figure 2:
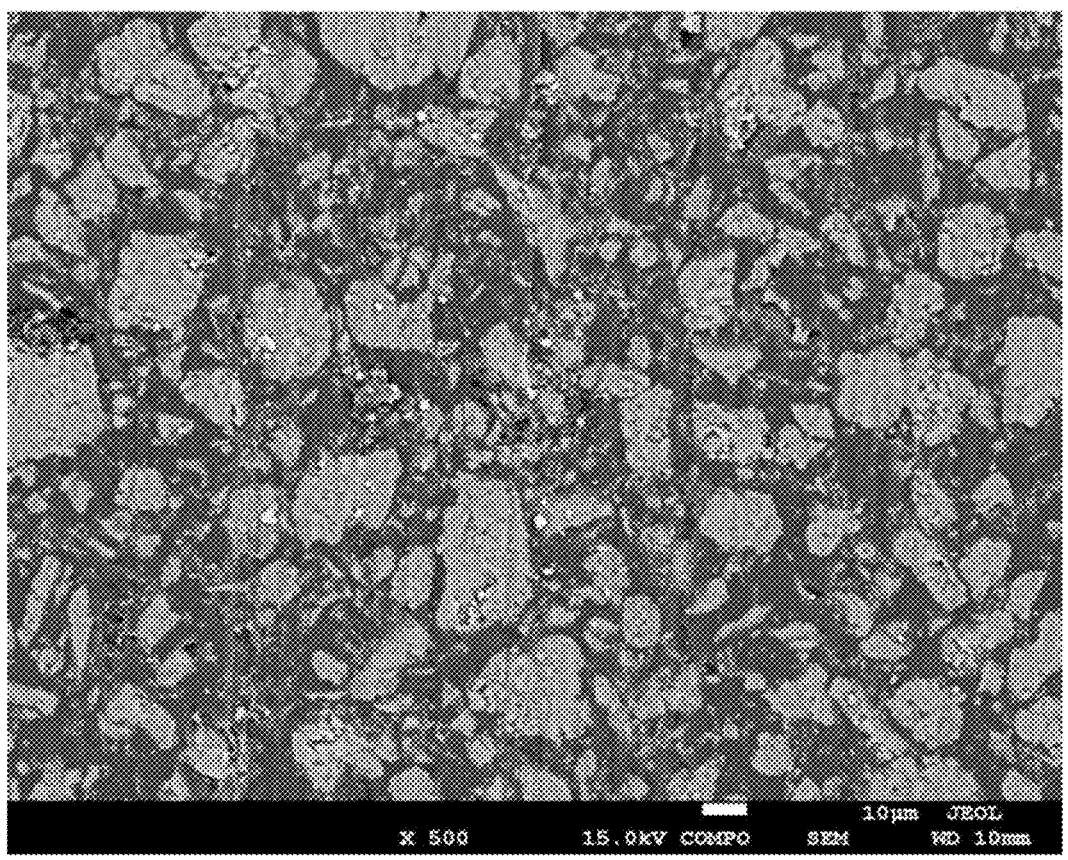
FIG. 2 shows the image of an acrylic material with $TiO_2$ acting as a photocatalyst, interacting with the ATH.

The presence of surface TiO$_2$ is also characterized in the samples, with homogeneity being observed all along the surface, as it can be observed in FIG. 2.

Figure 3:
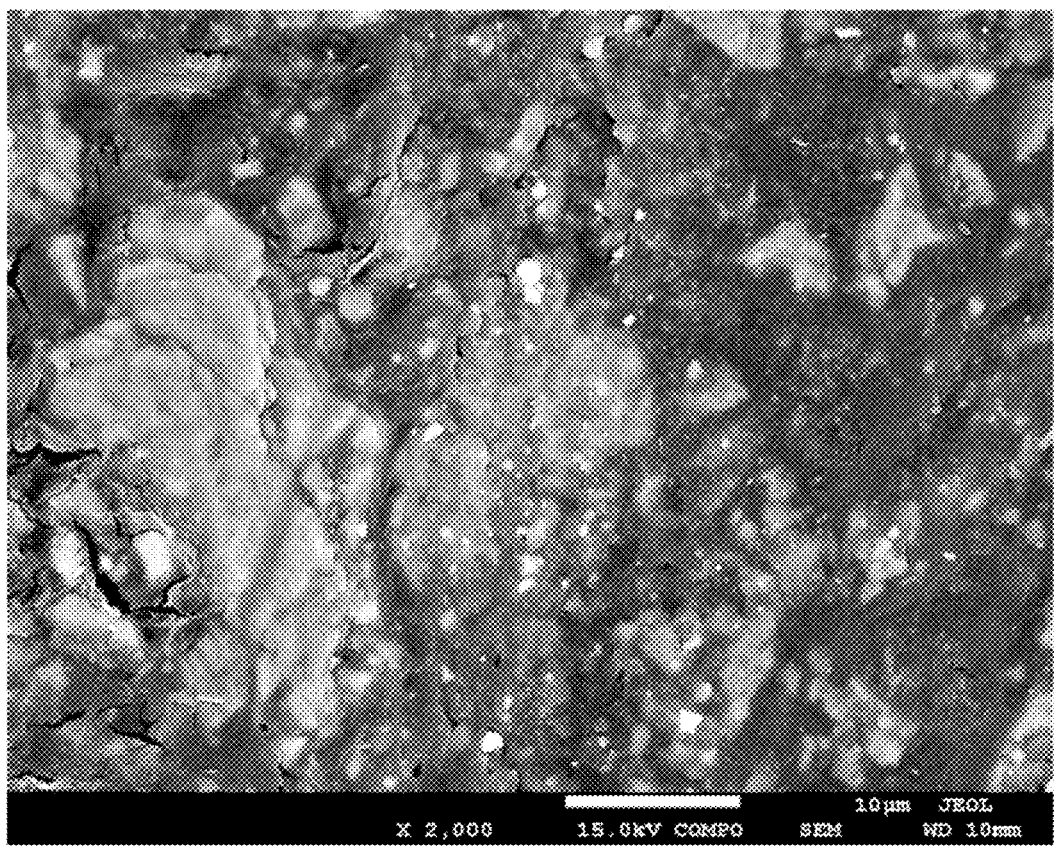
FIG. 3 shows an image of the same acrylic of FIG. 2 after sand-blasting, showing the photocatalyst, which are small particles of a whiter colour, interacting with ATH whitish particles of a bigger size.

The pieces were strongly sand-blasted over the surface with the purpose of eliminating the upper layer of the material and analysing the inner area of the piece. The object thereof is to analyse homogeneity of the material in its whole mass and see the photocatalyst distribution layer by layer in its entire mass. The SEM image of FIG. 3 shows again the distribution of white inorganic particles inside the PMMA polymer matrix.

Figure 4:
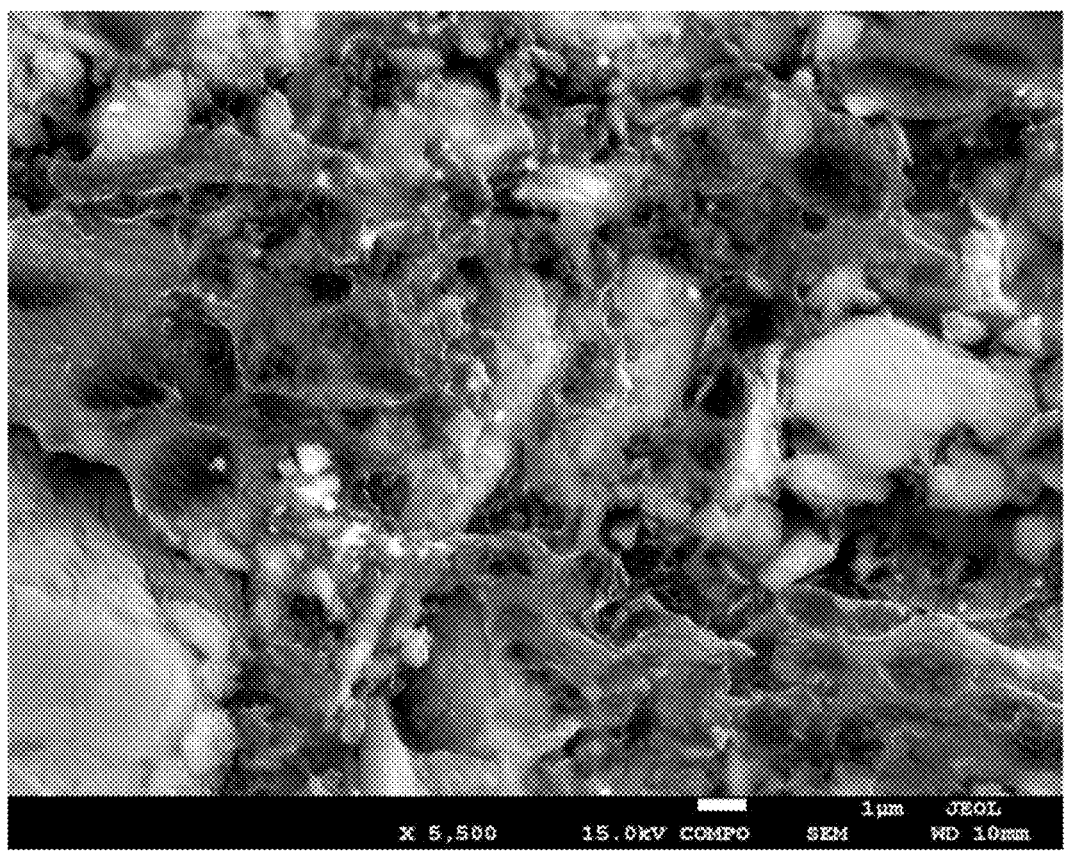
FIG. 4 shows an enlargement of the image of the same acrylic material of FIG. 3 after a second sand-blasting, showing the same interaction of the photocatalyst with the ATH.

Sand-blasting and image enlargement are performed again so as to check again a new layer of material with the presence of the photocatalyst on the surface, as it can be observed in FIG. 4.

Example 16: Physical Characterization of the Obtained Pieces

The physical characterization of the pieces obtained in the previous examples following ISO standards, is shown in the following Tables 1 and 2.

TABLE 1

Photocatalytic acrylic material characterization

| Properties | Assay standard | Example 8 | Example 10 | Example 11 | Example 12 | Example 13 | Example 14 |
|---|---|---|---|---|---|---|---|
| Density (g/cm$^3$) | ISO 1183 | 1.71-1.77 | 1.72-1.77 | 1.71-1.76 | 1.74-1.79 | 1.71-1.75 | 1.72-1.78 |
| Flexural modulus (MPa) | ISO 178 | 8500-11950 | 8450-10550 | 8600-12000 | 8550-11500 | 8600-11950 | 8400-10900 |
| Flexural strength (MPa) | ISO 178 | 60-69 | 61-70 | 60-75 | 66-75 | 60-71 | 58-66 |
| Tensile strength (MPa) | ISO 178 | 40-60 | 35-57 | 42-61 | 40-60 | 39-58 | 43-61 |
| Compression strength (MPa) | ISO 178 | 95-115 | 95-115 | 90-111 | 93-113 | 96-115 | 94-114 |
| Barcol Hardness | ISO 19712-2 | 62-63 | 63-64 | 62-63 | 63-64 | 63-65 | 62-63 |
| Shore Hardness | ISO 19712-2 | 90-95 | 90-95 | 90-95 | 90-95 | 90-95 | 90-95 |
| Rockwell Hardness | ISO 19712-2 | 86-93 | 86-93 | 86-93 | 86-93 | 86-93 | 86-93 |

TABLE 2

Characterization photocatalytic polyester material

| Properties | Assay standard | Example 9 |
|---|---|---|
| Density (g/cm$^3$) | ISO 1183 | 1.75-1.81 |
| Flexural modulus (MPa) | ISO 178 | 8900-12500 |
| Flexural strength (MPa) | ISO 178 | 58-68 |
| Tensile strength (MPa) | ISO 178 | 51-69 |
| Compression strength (MPa) | ISO 178 | 99-119 |
| Barcol Hardness | ISO 19712-2 | 64-67 |
| Shore Hardness | ISO 19712-2 | 90-95 |
| Rockwell Hardness | ISO 19712-2 | 95-100 |

Example 17: Degradation of Methylene Blue in an Aqueous Solution on the Piece from Example 8

The piece obtained in example 8 was assayed according to ISO 10678:2010. The results are summarized in the following Table 3:

TABLE 3

Results of methylene blue degradation by photocatalysis in piece from example 8

| $t_m$ (min) | $A_{\lambda, irr}$ | $A_{\lambda, dark}$ | E, $E_{av}$ (W m$^{-2}$) | $E_P$, $E_{P, av}$ (mol m$^{-2}$ h$^{-1}$) | $R_{irr}$ (mol m$^{-2}$ h$^{-1}$) | $R_{dark}$ (mol m$^{-2}$ h$^{-1}$) | PMB (mol m$^{-2}$ h$^{-1}$) | $\zeta_{MB}$ (%) |
|---|---|---|---|---|---|---|---|---|
| 0 | 0.739 | 0.739 | 10 | 0.11 | — | — | — | — |
| 180 | 0.736 | 0.720 | 10 | 0.11 | 2.40E−06 | −4.71E−08 | 2.45E−06 | 0.0022 |

It is observed that the methylene blue concentration resulting from the photocatalytic activity has been reduced in 0.49%.

Example 18: Degradation of Methylene Blue in an Aqueous Solution on the Piece from Example 9

The piece being assayed was that described in example 9 according to ISO 10678:2010. The results are summarized in the following Table 4:

TABLE 4

Results of methylene blue degradation by photocatalysis

| $t_m$ (min) | $A_{\lambda, irr}$ | $A_{\lambda, dark}$ | E, $E_{av}$ (W m$^{-2}$) | $E_P$, $E_{P, av}$ (mol m$^{-2}$ h$^{-1}$) | $R_{irr}$ (mol m$^{-2}$ h$^{-1}$) | $R_{dark}$ (mol m$^{-2}$ h$^{-1}$) | PMB (mol m$^{-2}$ h$^{-1}$) | $\zeta_{MB}$ (%) |
|---|---|---|---|---|---|---|---|---|
| 0 | 0.739 | 0.739 | 10 | 0.11 | — | — | — | — |
| 180 | 0.748 | 0.720 | 10 | 0.11 | 6.72E−06 | −4.71E−08 | 6.77E−06 | 0.0062 |

It is observed that the methylene blue concentration resulting from the photocatalytic activity has been reduced in 2.40%.

Example 19: Degradation of Methylene Blue in an Aqueous Solution on the Piece from Example 12

The piece being assayed was described in example 12, in an assay being the same as in the previous example according ISO 10678:2010. The results are summarized in the following Table 5:

TABLE 5

Results of methylene blue degradation by photocatalysis in the piece from example 12

| $t_m$ (min) | $A_{\lambda, irr}$ | $A_{\lambda, dark}$ | E, $E_{av}$ (W m$^{-2}$) | $E_P$, $E_{P, av}$ (mol m$^{-2}$ h$^{-1}$) | $R_{irr}$ (mol m$^{-2}$ h$^{-1}$) | $R_{dark}$ (mol m$^{-2}$ h$^{-1}$) | PMB (mol m$^{-2}$ h$^{-1}$) | $\zeta_{MB}$ (%) |
|---|---|---|---|---|---|---|---|---|
| 0 | 0.747 | 0.723 | 10 | 0.11 | — | — | — | — |
| 180 | 0.745 | 0.720 | 10 | 0.11 | 1.61E−06 | −4.71E−08 | 1.62E−05 | 0.−0147 |

It is observed that the methylene blue concentration resulting from the photocatalytic activity has been reduced in 0.22%.

Example 20: Degradation of Methylene Blue in an Aqueous Solution on the Piece from Example 7

The piece being assayed was that described in example 7 according to ISO 10678:2010. The results are summarized in the following Table 6:

TABLE 6

Results of methylene blue degradation by photocatalysis in the piece from example 7

| $t_m$ (min) | $A_{\lambda, irr}$ | $A_{\lambda, dark}$ | E, $E_{av}$ (W m$^{-2}$) | $E_P$, $E_{P, av}$ (mol m$^{-2}$ h$^{-1}$) | $R_{irr}$ (mol m$^{-2}$ h$^{-1}$) | $R_{dark}$ (mol m$^{-2}$ h$^{-1}$) | PMB (mol m$^{-2}$ h$^{-1}$) | $\zeta_{MB}$ (%) |
|---|---|---|---|---|---|---|---|---|
| 0 | 0.725 | 0.723 | 10 | 0.11 | — | — | — | — |
| 180 | 0.743 | 0.720 | 10 | 0.11 | −5.52E−06 | −4.71E−08 | −5.47E−06 | −0.0050 |

It can be observed that the methylene blue concentration resulting from the photocatalytic activity is ≤0%, thus showing no activity.

Example 21: Degradation of Methylene Blue in an Aqueous Solution on the Piece from Example 8

The assay was performed on the sample from example 8. The assay conditions have been adapted according to ISO 27447: 2009. The UV irradiation source is between 315 to 400 nm of 22 W. The pieces were pre-treated by leaving them under the irradiation source for 12 hours. After this time, a known and controlled amount of each pesticide to be assessed was deposited on the surface. These were left under photocatalysis conditions for 8 hours of irradiation. After that time the samples were each introduced in a 50 mL Falcon tube and were extracted with 10 mL with PAR-grade (Pesticide Analysis Residue) acetonitrile as solvent under stirring for 5 minutes. The samples were centrifuged for 5 minutes at 4000 r.p.m. After settling, 0.400 μL of the extract were transferred into a vial which was added 0.600 μL of ethyl acetate.

All the vials, as well as the calibration line prepared under the same conditions, are analysed in a gas chromatography equipment (GC Agilent 7890B) fitted with an automatic injector (Agilent 7693A) coupled to a mass spectrometer with triple quadrupole analyser (QqQ) MS/MS-Q EI 7000 operating in EI (electronic ionization) mode. It is observed that the amount of pesticide is reduced in each case, with the results shown in Table 7:

TABLE 7

Results of pesticides elimination in example 8

| Pesticide | Initial Concentration (ppb) | Final concentration (ppb) | % Reduction |
|---|---|---|---|
| 1,2,3,6-tetrahydrofthalamide | 137.3 | 90.3 | 34.2 |
| 2-Phenylphenol | 122.8 | 9.2 | 92.5 |
| 4,4'-Dichlorobenzophenone | 89.1 | 8.6 | 90.3 |
| Acephate | 68.4 | 43.2 | 36.8 |
| Aclonifen | 76.6 | 27.7 | 63.8 |
| Acrinathrin | 71.3 | 0.0 | 100.0 |
| Alachlor | 94.5 | 16.0 | 83.1 |
| Anthraquinone | 88.0 | 0.4 | 99.5 |
| Atrazine | 91.0 | 27.7 | 69.6 |
| Azinphos-ethyl | 80.0 | 15.7 | 80.3 |
| Benalaxyl | 84.8 | 41.5 | 51.1 |
| Benfluralin | 86.7 | 2.4 | 97.3 |
| Bifenthrin | 102.2 | 16.8 | 83.6 |
| Boscalid | 96.5 | 19.0 | 80.3 |
| Bromopropylate | 102.8 | 41.8 | 59.3 |
| Bupirimate | 88.2 | 3.1 | 96.5 |
| Buprofezin (Z) | 97.7 | 12.6 | 87.1 |
| Captan | 55.0 | 5.4 | 90.2 |
| Chinomethionate | 115.3 | 0.0 | 100.0 |
| Chlorfenvinphos | 86.4 | 0.0 | 100.0 |
| Chlorothalonil | 66.1 | 1.6 | 97.6 |
| Chlorpyrifos | 95.2 | 1.5 | 98.5 |
| Chlorpyrifos-methyl | 79.7 | 2.1 | 97.4 |
| Chlorthal-dimethyl | 89.7 | 23.2 | 74.2 |
| Cyflufenamid | 101.9 | 47.1 | 53.8 |
| Coumaphos | 71.9 | 1.0 | 98.6 |
| Cyfluthrin | 85.1 | 4.1 | 95.2 |
| Cypermethrin | 91.3 | 0.0 | 100.0 |
| Cyproconazole | 101.2 | 48.5 | 52.1 |
| o,p'-DDT | 77.7 | 15.2 | 80.4 |
| Deltamethrin | 66.7 | 0.0 | 100.0 |
| Diazinon | 100.7 | 27.7 | 72.5 |
| Dichlobenil | 93.4 | 12.7 | 86.4 |
| Dichlofluanid | 82.7 | 11.7 | 85.9 |
| Dichlorvos | 57.1 | 12.6 | 77.9 |
| Dicloran | 85.1 | 0.0 | 100.0 |
| Dicofol | 89.3 | 7.7 | 91.4 |
| Dieldrin | 90.8 | 4.4 | 95.2 |
| Diethyltoluamide | 92.3 | 43.7 | 52.6 |
| Diflufenican | 73.0 | 16.5 | 77.4 |
| Diphenylamine | 117.8 | 0.0 | 100.0 |
| Endosulfan I | 94.8 | 69.4 | 26.9 |
| Endosulfan II | 96.3 | 32.6 | 66.1 |
| Endrin | 86.0 | 15.9 | 81.5 |
| Ethion | 99.6 | 34.4 | 65.4 |
| Ethoprophos | 93.1 | 41.4 | 55.6 |
| Ethoxyquin | 335.3 | 0.0 | 100.0 |
| Etofenprox | 97.9 | 12.6 | 87.2 |
| Etoxazole | 97.3 | 8.5 | 91.3 |
| Etridiazole | 79.8 | 8.4 | 89.5 |
| Famoxadone | 89.6 | 12.4 | 86.2 |
| Fenazaquin | 98.9 | 0.0 | 100.0 |
| Fenitrothion | 87.7 | 9.9 | 88.7 |
| Fenpropathrin | 99.3 | 2.3 | 97.7 |
| Fenthion | 1114.7 | 0.0 | 100.0 |
| Fenvalerate + Esfenvalerate | 90.0 | 0.0 | 100.0 |
| Fluazifop-butyl | 89.0 | 2.6 | 97.1 |
| Flucythrinate | 97.0 | 0.0 | 100.0 |
| Fludioxonil | 86.8 | 0.0 | 100.0 |
| Fluquinconazole | 83.5 | 36.3 | 56.5 |
| Flusilazole | 92.7 | 63.8 | 31.2 |
| Folpet | 49.7 | 18.7 | 62.4 |
| Fonofos | 151.1 | 18.1 | 88.1 |
| Heptachlor | 82.9 | 32.3 | 61.0 |
| Heptenophos | 74.4 | 11.9 | 84.0 |
| Indoxacarb | 75.1 | 15.0 | 80.1 |
| Iprodione | 64.7 | 9.5 | 85.3 |
| Isofenphos-methyl | 161.4 | 27.4 | 83.0 |
| Kresoxim-methyl | 102.5 | 0.0 | 100.0 |
| Lambda-cyhalothrin | 87.1 | 0.9 | 99.0 |
| Lindane | 94.0 | 85.1 | 9.5 |
| Malaoxon | 38.8 | 25.4 | 34.5 |
| Malathion | 80.4 | 36.6 | 54.5 |
| Metalaxyl | 89.8 | 27.7 | 69.2 |
| Metazachlor | 90.3 | 14.6 | 83.8 |
| Methidathion | 67.1 | 4.2 | 93.7 |
| Metrafenone | 90.9 | 0.0 | 100.0 |
| Myclobutanil | 94.2 | 52.5 | 44.3 |
| Nuarimol | 96.2 | 0.0 | 100.0 |
| Ofurace | 81.6 | 12.0 | 85.3 |
| Oxadiazon | 97.8 | 2.5 | 97.4 |
| Oxadixyl | 92.3 | 25.2 | 72.7 |
| Oxyfluorfen | 81.9 | 0.0 | 100.0 |
| Parathion | 80.3 | 8.8 | 89.0 |
| Parathion-methyl | 67.2 | 5.3 | 92.1 |
| Penconazole | 95.2 | 13.4 | 85.9 |
| Permethrin | 98.8 | 29.2 | 70.5 |
| Phenthoate | 84.4 | 50.2 | 40.5 |
| Phosalone | 79.0 | 2.5 | 96.9 |
| Phosmet | 61.6 | 6.0 | 90.2 |
| Piperonyl butoxide | 99.8 | 0.0 | 100.0 |
| Pirimiphos-ethyl | 110.4 | 0.0 | 100.0 |
| Pirimiphos-methyl | 108.0 | 5.2 | 95.2 |
| Procymidone | 88.9 | 19.8 | 77.7 |
| Profenofos | 75.6 | 20.2 | 73.3 |
| Prometryn | 100.7 | 3.5 | 96.6 |
| Propargite | 90.2 | 16.5 | 81.7 |
| Propiconazole | 93.4 | 22.6 | 75.8 |
| Propyzamide | 94.8 | 39.1 | 58.7 |
| Pyrazophos | 84.2 | 0.0 | 100.0 |
| Pyridaben | 98.1 | 0.0 | 100.0 |
| Pyridaphenthion | 82.1 | 3.6 | 95.6 |
| Pyrifenox | 89.2 | 12.3 | 86.2 |
| Pyriproxyfen | 95.1 | 8.2 | 91.4 |
| Quinalphos | 92.1 | 0.0 | 100.0 |
| Quinoxyfen | 87.6 | 0.0 | 100.0 |
| Quizalofop-ethyl | 92.8 | 0.0 | 100.0 |
| Simazine | 93.3 | 16.3 | 82.5 |
| Spirodiclofen | 83.9 | 5.7 | 93.2 |
| Spiromesifen | 79.5 | 13.4 | 83.1 |
| Sulfotep | 92.7 | 52.3 | 43.6 |
| Tau-fluvalinate | 74.1 | 0.0 | 100.0 |
| Tebufenpyrad | 91.9 | 17.0 | 81.5 |
| Tefluthrin | 100.9 | 44.9 | 55.5 |
| Terbuthylazine | 101.3 | 25.8 | 74.5 |
| Tetradifon | 99.4 | 0.0 | 100.0 |
| Triadimefon | 99.3 | 5.8 | 94.2 |
| Triadimenol | 97.5 | 31.4 | 67.8 |
| Triazophos | 82.0 | 39.7 | 51.6 |
| Trifluralin | 91.6 | 1.8 | 98.0 |
| Vinclozolin | 100.5 | 24.9 | 75.2 |
| Zoxamide | 57.0 | 3.7 | 93.6 |

Example 22. Degradation $NO_x$ in Gas Phase on Piece from Example 8

The assay was performed with the piece obtained in the example 8, following the ISO 22197-1 standard. The results are reflected in Table 8, where an effective $NO_x$ removal.

TABLE 8

NO$_x$ removal in example 8

Units: μmol

| Sample | NOT provided | NOT provided | Unreacted NO$_2$ | Generated NO$_2$ | Removed NO$_x$ |
|---|---|---|---|---|---|
| Example 8 | 36.24 | 0.22 | 36.02 | 0.04 | 0.17 |

Example 23: Degradation of Methylene Blue in an Aqueous Solution on the Piece from Example 13

The piece being assayed was described in example 13, in an assay being the same as that of the previous example according to ISO 10678:2010. The results are summarized in the following Table 9:

TABLE 9

Results of methylene blue degradation by photocatalysis in the piece from example 13

| $t_m$ (min) | $A_{\lambda, irr}$ | $A_{\lambda, dark}$ | E, E$_{av}$ (W m$^{-2}$) | E$_P$, E$_{P, av}$ (mol m$^{-2}$ h$^{-1}$) | R$_{irr}$ (mol m$^{-2}$ h$^{-1}$) | R$_{dark}$ (mol m$^{-2}$ h$^{-1}$) | PMB (mol m$^{-2}$ h$^{-1}$) | $\zeta_{MB}$ (%) |
|---|---|---|---|---|---|---|---|---|
| 0 | 0.747 | 0.723 | 10 | 0.11 | — | — | — | — |
| 180 | 0.746 | 0.720 | 10 | 0.11 | 2.83E−06 | −4.71E−08 | 2.87E−06 | 0.0026 |

It is observed that the methylene blue concentration resulting from the photocatalytic activity has been reduced in 0.11%.

Example 24. NO$_x$ Degradation in Gas Phase on the Piece from Example 14

The assay was performed with the piece obtained in example 14, following the ISO 22197-1 standard. The results are reflected in Table 10, where an effective elimination of NO$_x$.

TABLE 10

Elimination of NO$_x$ in example 14

Units: μmol

| Sample | NOT provided | Removed NO | Unreacted NO$_2$ | Generated NO$_2$ | Removed NO$_x$ |
|---|---|---|---|---|---|
| Example 6 | 37.3 | 0.22 | 37.08 | 0.10 | 0.12 |

Example 25. Determination of Antibacterial Activity in the Piece from Example 8

The assay was performed with the piece obtained in example 8, following the ISO 22197-1 standard. The results being reflected in Table 11 show an effective removal of the S. Aureus bacterium of 72.11% more.

TABLE 11

Antibacterial effect in example 8

| S. Aureus | Cells/ml | Slope reduction | Increase (%) |
|---|---|---|---|
| Innoculated Bacteria | 1.41E+05 | 0 | — |

TABLE 11-continued

Antibacterial effect in example 8

| S. Aureus | Cells/ml | Slope reduction | Increase (%) |
|---|---|---|---|
| Assay untreated piece | | 17.8 | — |
| Assay piece example 8 | | 30.64 | 72.11% |

The invention claimed is:

1. A method for obtaining a photocatalytic polymer, the method comprising:
   a) mixing aluminium trihydroxide and at least a photocatalytic particle in water at a pH between 5 and 7 under stirring;
   b) adding a silane or a siloxane,
   c) stirring for a minimum of time of 100 min at a temperature between 30 and 50° C.,
   d) extracting the solid phase being formed and drying for obtaining a photocatalytic additive, and
   e) adding said photocatalytic additive to an acrylic or polyester resin and polymerizing for obtaining the photocatalytic polymer.

2. A The method according to claim 1, wherein said aluminium trihydroxide is added at a concentration between 10 and 65% by weight with respect to the final weight of the photocatalytic additive.

3. The method according to claim 1, wherein said photocatalytic particle is selected from the group consisting of TiO$_2$ rutile, ZnS, SnO$_2$, ZnO, ZnS, SnO$_2$, ZnO CdS, Fe$_2$O$_3$, Cu$_2$O, WO$_3$, SnO$_2$ and TiO$_2$ anatase, and mixtures thereof.

4. The method according to claim 3, wherein said photocatalyst particle is selected from the group consisting of TiO$_2$ rutile, ZnS, SnO$_2$, ZnO and TiO$_2$ anatase.

5. The method according to claim 4, wherein said photocatalytic particle is TiO$_2$ rutile and/or TiO$_2$ anatase.

6. The method according to claim 1, comprising the removal of particles lower than 0.5 μm before adding silane or siloxane.

7. The method according to claim 1, wherein said siloxane is bis[3-(trietkoxysylyl)propyl] tetrasulphide.

8. The method according to claim 1, wherein said silane is an alkyl silane, unsaturated silane, aromatic silane or aminosilane.

9. The method according to claim 8, wherein said alkyl silane is methyltrimethoxysilane.

10. The method according to claim 8, wherein said unsaturated silane is gamma-methacryloxypropyltrimethoxysilane.

11. The method according to claim 8, wherein said aromatic silane is vinyl-tris-(ethoxy)silane.

12. The method according to claim 8, wherein said aminosilane is gamma-aminopropyltriethoxysilane or N-beta-(aminoethyl)-gamma aminopropyltrimethoxysilane.

13. The method according to claim 1, wherein said extraction of the solid phase from step d) is by decantation.

14. The method according to claim 1, comprising an additional step of milling said photocatalytic additive before the addition to the resin of step e).

15. A photocatalytic additive, comprising at least a photocatalytic particle, aluminium trihydroxide and a silane or siloxane, wherein said photocatalytic additive is obtained according to the method of claim 1.

16. A polymer acrylic material, comprising the photocatalytic additive of claim 15, wherein said photocatalytic particle is selected from the group consisting of $TiO_2$ rutile, ZnS, $SnO_2$, ZnO, ZnS, $SnO_2$, ZnO CdS, $Fe_2O_3$, $Cu_2O$, $WO_3$, $SnO_2$, $TiO_2$ anatase, and mixtures thereof.

17. A polyester polymer material, comprising the photocatalytic additive of claim 15, wherein said photocatalytic particle is selected from the group consisting of $TiO_2$ rutile, ZnS, $SnO_2$, ZnO, ZnS, $SnO_2$, ZnO CdS, $Fe_2O_3$, $Cu_2O$, $WO_3$, $SnO_2$, $TiO_2$ anatase, and mixtures thereof.

* * * * *